UNITED STATES PATENT OFFICE.

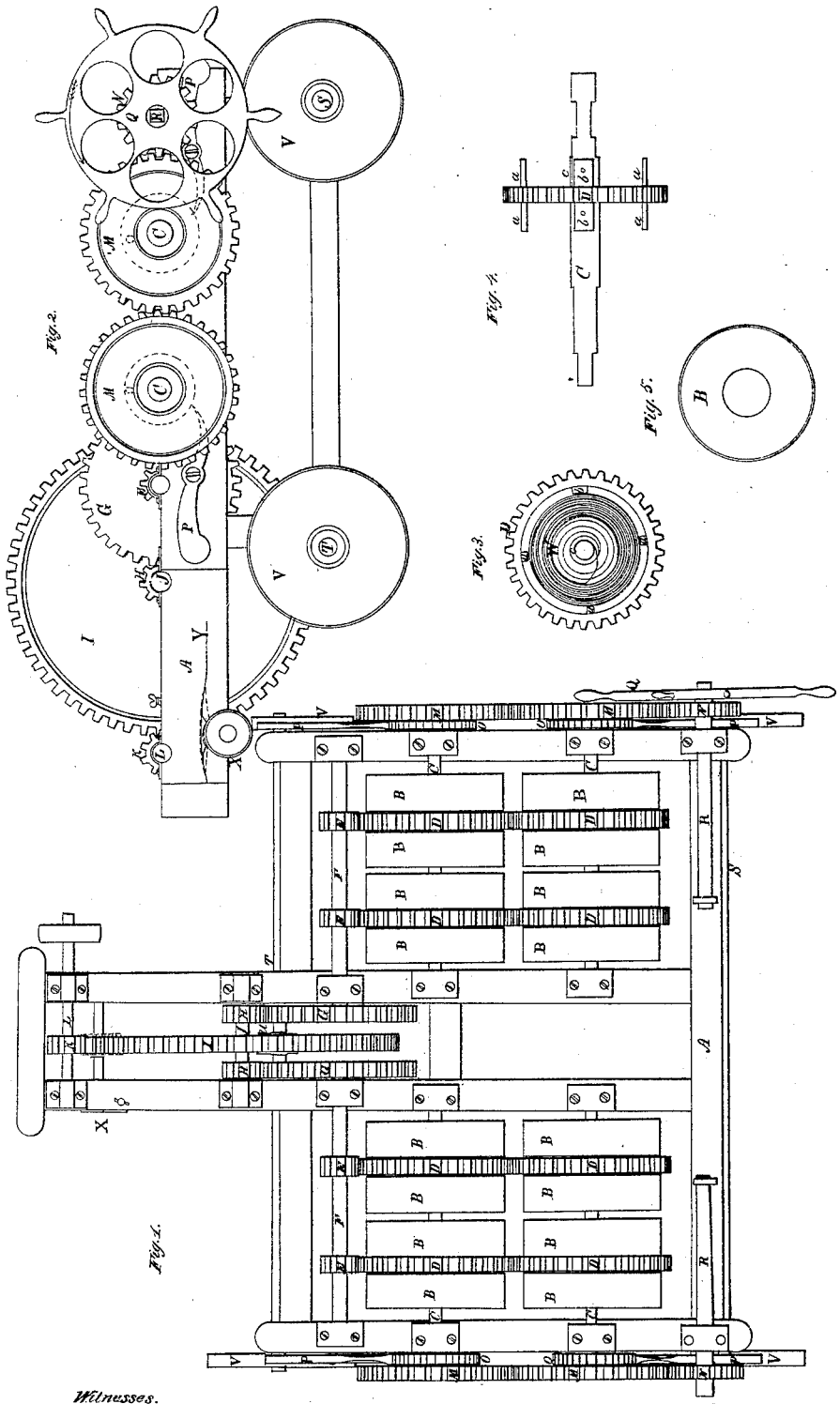

GEORGE W. MORGAN, OF PRATTSBURG, NEW YORK.

MODE OF APPLYING SPRINGS AS A MOTIVE POWER.

Specification of Letters Patent No. 23,260, dated March 15, 1859.

*To all whom it may concern:*

Be it known that I, GEORGE W. MORGAN, of Prattsburg, in the county of Steuben and State of New York, have invented a new and Improved Mode of Applying Springs as Motors; and I do hereby declare that the following is a full, clear, and exact description of the construction and operation of the same, reference being had to the accompanying drawings, making a part of this specification, in which—

Figure 1 is a bird's-eye view of the whole machine. Fig. 2 is a side elevation of the same. Fig. 3 is a view of a wheel showing a spring. Fig. 4 is a view of a wheel and shaft showing projections that confine the spring. Fig. 5 is a view of the case that covers the spring.

The letters of reference refer to the same parts in each figure.

A, is a frame in which the other parts of my invention are secured.

B, in each place and figure represents the case that covers the springs. It is made of any kind of sheet metal and any size to suit the springs and serves as covering for the same.

C, C, C and C, are the shafts that support the spring-wheels and springs. The inner ends of the springs are attached to the shaft or a collet on the shaft. The other end is attached to the projection b on the wheels.

D, represents the driving wheels, eight in number. They are placed upon the shaft C, and made to turn loosely. They each have projections on each side that receive and hold the springs. These wheels run together in pairs so that the united force of the springs may be concentrated to the wheel I, by the aid of the intermediate gearing as hereinafter described.

E, E, E and E are pinions firmly attached to the shafts F and F. These pinions receive the power of the pairs of wheels and convey it to the shafts F.

F and F, are shafts that support the wheels G, also the pinions E, and transmit the power to the wheels G, which are fastened on the inner ends of the shafts F. These wheels transmit the power to the pinions on the shaft J.

H and H, are pinions placed on the shaft J, at each side of the wheel I.

I, is a wheel fastened firmly to the shaft J. It receives the power of the springs as transmitted through the train of gearing to it. It drives a pinion on the shaft L, also a pinion U, on the shaft T, also one on the governor shaft.

J, is a shaft that receives and holds the wheel I, and pinions H and H.

K, is a pinion firmly attached to the shaft L. It is used to transmit the power to the shaft L.

L, is a shaft that receives and holds the pinion K and has a pulley attached to it which may be made of any size. Its use is to transmit the power to other kinds of machinery such as a lathe, circular-saw or for any other purposes required.

M, M, M and M, are winding wheels of the same size of the wheels D. They are fastened to the outer ends of the shafts C. Their use is to wind the springs and keep them all in the same working position.

N and N are pinions attached to the shafts R and R. They are used to drive the winding wheels.

O, O, O, and O, are ratchet wheels firmly attached to the shafts C, C, C and C, and may be made any convenient size. Their use is to hold the shafts from turning when the springs are giving off their power.

P, P, P and P, are pawls made with balance weights to hold them into the ratchets without the aid of springs.

Q, is a wheel with handles on its periphery. It is made to fit loosely upon the square ends of either of the shafts R, on each of which it is to be used. Its use is to transmit the power of the hand through this train of gearing to wind the springs, and by it all the springs of one side may be wound, and by placing it upon the other shaft the springs of the other side may be wound also.

R and R, are shafts placed on the top of the frame. They are fastened within the wheels N and N. The outer ends are made square to receive the winding wheel.

S, is a shaft with car wheels V attached to the outer ends. This shaft is attached to the lower part of the frame loosely or is allowed to turn freely as a car-wheel shaft. T is a similar shaft with wheels V, also at each end, and is attached to the frame loosely so as to turn freely. At the center of this shaft is a pinion U, that is driven by wheel I. By the aid of these or similar wheels the power of the springs may be applied to locomotive purposes.

U, is a pinion used to transmit the power to the locomotive portion of the machine, and when not used for this purpose it may be put out of gear.

V, V, V and V, are wheels as carwheels placed firmly and fastened on the shafts S and T. They are used as carwheels to support and convey the whole machine.

W, is a spring made of any convenient size, strength and width. The inner end of the spring is attached to the shafts C, or a collet upon the shaft. The spring is coiled within the projections $a$, $a$, $a$ and $b$, and is secured to the projection $b$. When not in use the springs rest against the projections.

X, is a friction pulley. Its use is to hold and regulate the motion of the machine.

Y, is a friction lever that is applied to the surface of the pulley X, and it may be increased or diminished at will.

$c$, is a collet applied to the shaft and may be of any size or of the size of the large part of the shaft.

To use my invention when made as specified, wind the springs on one or both sides, then loose the governor and all the parts that are in connection with the wheel I will be put in motion.

I do not claim the use of wheels and pinions operated by springs, nor two or more springs on one shaft, nor the duplication of wheels, nor the application of springs on both sides of the motor wheels for all these are known devices, but What I do claim as my invention is—

The arrangement of the springs B B, &c., wheels D D, &c., with lugs $a$, $a$, $a$, pinions E E, &c., concentrating the power on the pinions H H on each side of the wheel I, and the pinions N N and shafts R R for winding up at the same time all the springs on either side of the wheel I when the whole are constructed and operated for joint action as described.

GEORGE W. MORGAN.

Witnesses:
A. H. VAN HOUSEN,
CHAS. KETCHUM.